July 12, 1960 G. L. MATTHAEI 2,945,195

MICROWAVE FILTER

Filed March 25, 1958 2 Sheets-Sheet 1

GEORGE L. MATTHAEI
INVENTOR.

BY Jerry A. Dinardo, agent
Morris Spector
ATTORNEY

GEORGE L. MATTHAEI
INVENTOR.
BY Jerry G. Dinardo, agt
Morris Spector
ATTORNEY

United States Patent Office 2,945,195

Patented July 12, 1960

2,945,195

MICROWAVE FILTER

George L. Matthaei, Inglewood, Calif., assignor, by mesne assignments, to Thompson Ramo Wooldridge Inc., Cleveland, Ohio, a corporation of Ohio Filed Mar. 25, 1958, Ser. No. 723,770

1 Claim. (Cl. 333—73)

This invention relates to microwave band pass filters, and in particular to improvements in those types of filters known as strip transmission line filters.

Strip transmission line filters are known to comprise a resonator assembly disposed between two parallel conductive plates. The elements of the resonator assembly may comprise a linear array of conductive bars supported on dielectric plates, or conductive strips or lines printed on a dielectric sheet.

In general, the resonator elements are designed to have a size which is an appreciable fraction of the wave length of the mid-frequency of the passband, for example, one half-wave length. Consequently, filters made with half-wave length elements are rather bulky. In addition, the maximum stop-band attenuation above the pass band is not as high as might be desired if the pass band width is an appreciable fraction of the mid-frequency of the filter pass band (say 25% or more). Another drawback of half-wave length resonators is that the second passband occurs at twice the first passband frequency, so that low order harmonics will not be rejected. Finally, because resonator elements have heretofore been supported by or on dielectric sheets, some amount of dielectric loss is unavoidable.

Accordingly, an object of this invention is to reduce the size of microwave bandpass filters of the strip transmission line type.

A further object is to increase the maximum stop-band attenuation above the pass band of filters of this type.

Another object is to provide a new and improved microwave filter of the type described, in which the second passband is farther removed from the first passband frequency than is the case in many prior art filters.

The above and other objects are realized, in accordance with this invention by providing a strip transmission line filter in which the resonator elements are nominally a quarter-wave length long and in which there are provided series capacitance discontinuities, alternating with shunt inductance discontinuities, at substantially quarter-wave length intervals.

In one embodiment, the resonator elements are made up of a linear array of mutually spaced cross-shaped conductors. In this embodiment, the arms of each cross serve both as shunt inductances and as self-supports, not requiring dielectric sheets. The spacings between the cross-shaped members serve as series capacitance gaps.

Figure 1:
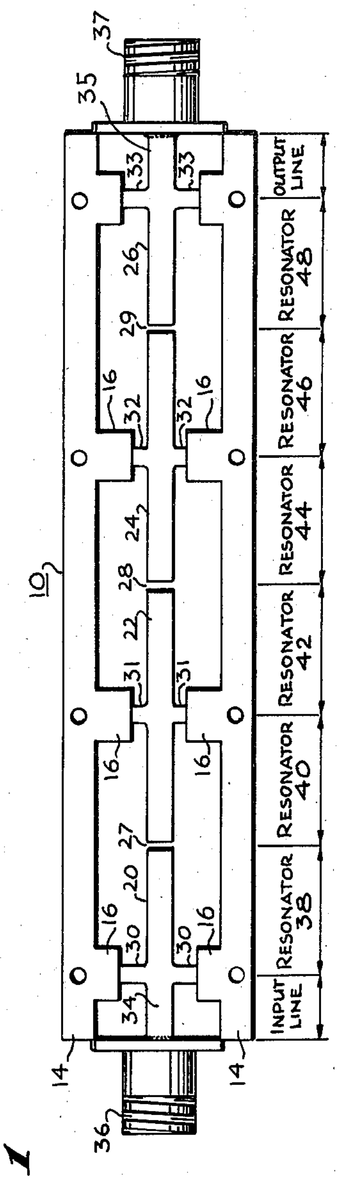
Figure 1 is a plan view with portions removed, showing a six-resonator filter, constructed in accordance with the invention.
Figure 2:
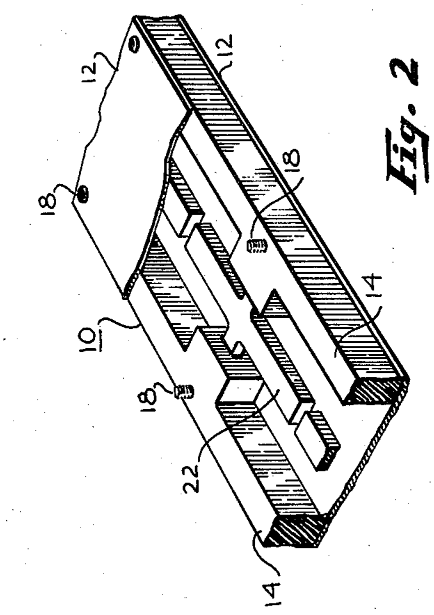
Figure 2 is a partial perspective view of the filter shown in Figure 1.

Referring to Figures 1 and 2, there is shown a strip transmission line filter 10, which comprises a pair of parallel elongated metal plates, or ground plane plates 12, which are spaced apart by a pair of metal side bars 14. The metal side bars 14 are formed with pairs of oppositely disposed, inwardly projecting mounting blocks 16, which are spaced appropriate distances apart along the length of the filter 10. The two ground plane plates 12 may be secured to the side bars 14 by bolts 18 located adjacent to the mounting blocks 16.

In accordance with the invention, a linear array of elongated cross-shaped conductors 20, 22, 24, and 26 are disposed between and parallel to the ground plane plates 12. The cross conductors 20 to 26 are arranged end-to-end, with small gaps 27, 28, and 29 therebetween constituting series capacitances. The cross conductors 20 to 26 are preferably made of flat metal bars. The short arms 30, 31, 32 and 33 of the cross conductors 20 to 26 may have their ends mounted in the blocks 16 as shown to provide the sole support for the cross conductors. Alternatively, the cross conductors 20 to 26 may be formed by photoetching copper foil attached to a dielectric support sheet with the outer ends grounded to the cover plates by metal blocks. These short circuited arms or stubs 30 to 33 serve as shunt inductances. The two end portions 34 and 35 of the array of cross conductors 20 to 26 serve as input and output lines respectively, and terminate in input and output connectors 36 and 37.

The array of cross conductors 20 to 26, gaps 27, 28, 29 and stubs 30 to 33 all combine to produce a series of (in this case six), quarter-wave length resonators 38, 40, 42, 44, 46 and 48 formed by nominally quarter-wave length sections of line each having a series coupling discontinuity or capacitance on one end, and a shunt coupling discontinuity or inductance on the other end. The dimensions of the capacitances formed by the gaps 27, 28, and 29 and of the inductances formed by the stubs 30 to 33 are small as compared to a quarter-wave length so that they constitute lumped reactances. The resonator length is defined as the distance between a capacitive gap and a shunt inductor, which is nominally one quarter-wave length of the mid-frequency of the passband for which the filter 10 is designed. Actually, the distances are slightly less than one quarter-wave length. For example, for filters having a bandwidth of five percent or less, the resonator lengths are very nearly one quarter-wave length. For wider bandwidths, the resonators tend to become appreciably less than one quarter-wave length, and may be as small as one eighth of a wave length.

In most cases efficient design will result in a filter which is symmetrical about its center. It is a property of such designs that the length of the stubs tend to become shorter for stubs near the center of the filter, while the capacitive gaps will tend to become larger towards the center. In the filter shown, for instance, the stubs 31 and 32 nearest the center are shorter than the stubs 30 and 33. Also the gap 28 in the center is somewhat wider than the two gaps 27 and 29.

In some designs it may be preferred to use one relatively short stub projecting from each of the conductors 20, 22, 24 and 26 instead of two relatively long stubs, in which case the conductors 20 to 26 would not be cross-shaped.

One of the advantages of this filter construction made with quarter-wave length resonators is the great reduction in size as compared to comparable filters made with half-wave length resonators. Another advantage resulting from the use of smaller resonator elements is the fact that the resonator elements may be self-supporting. Except for rather low microwave frequencies, that is, of the order of 1500 megacycles or below, dielectric supports may be completely eliminated, thereby simplifying construction and eliminating all dielectric losses.

Figure 3:
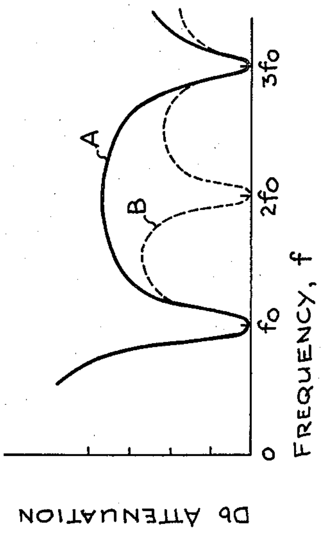
Figure 3 is a graph, showing a comparison of attenuation characteristics of analogous filters with quarter-wave length and half-wave length resonators, as indicated by theory.

Additional advantages are evident from the graph of Figure 3, which shows a comparison of attenuation characteristics of analogous filters with quarter-wave length and half-wave length resonators. Solid curve A shows an attenuation characteristic for a quarter-wave length filter and dotted curve B the approximate attenuation characteristic for a corresponding half-wave length filter. It will be noted that the attenuation characteristic above $f_0$ is both higher and broader for the quarter-wave length resonator filter.

The graph of Figure 3 shows that whereas in a filter having half-wave length resonators, the second passband occurs at $2f_0$ which is twice the first passband frequency $f_0$, in a filter having quarter-wave length resonators, the second passband occurs at $3f_0$ which is three times the first passband frequency $f_0$. There is thus an improvement in the rejection of low order harmonics for the quarter-wave length resonators.

The embodiment of Figures 1 and 2 is preferred for frequencies above 1500 megacycles because the resonator elements or cross conductors 20 to 26 can be made so small as not to require a dielectric support. For the lower frequencies, however, the resonator elements may become too large to be self-supporting, so that some auxiliary support may be necessary. The embodiment shown in Figures 4 to 6 is particularly suitable for this purpose.

Figure 4:
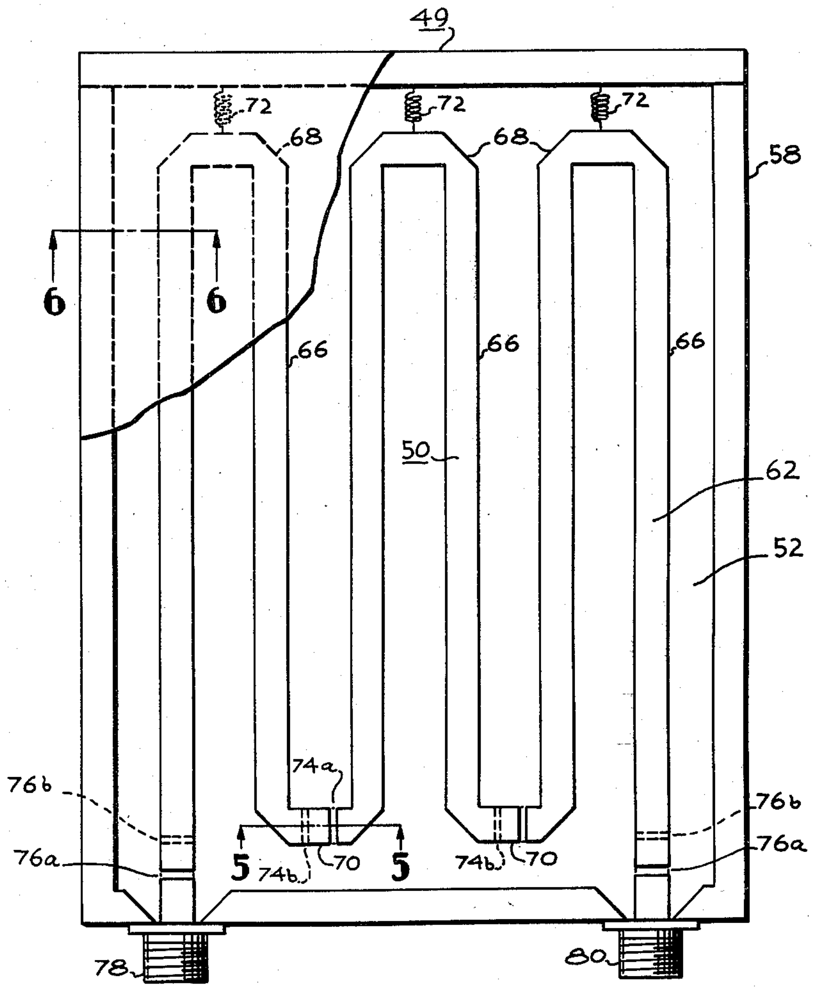
Figure 4 is a plan view of another embodiment of the invention which is useful at lower frequencies than is the filter shown in Figures 1 and 2.
Figure 5:
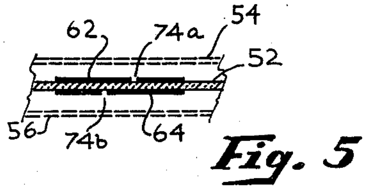
Figure 5 is a sectional view, taken along line 5—5 of Figure 4.
Figure 6:
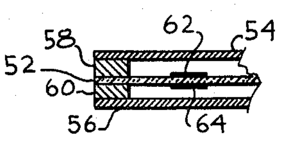
Figure 6 is a sectional view taken along line 6—6 of Figure 4.

Referring to Figures 4 to 6, the filter 49 includes a resonator assembly 50 supported on a dielectric sheet 52 and sandwiched between two ground plane plates 54 and 56. Two metal framing members or spacers 58 and 60 surround and clamp the periphery of the dielectric sheet 52 and space it from the plates 54 and 56. The resonator assembly 50 includes two sinuous transmission lines 62 and 64, one on each side of the sheet 52. The transmission lines 62 and 64 may be formed by coating the dielectric sheet 52 on both sides with metal, such as copper, and then etching away the metal to leave an array of parallel M-shaped conductive strips 66 connected end-to-end by bends 68 and 70.

The bends 68 and 70 in each of the transmission lines 62 and 64 are somewhat less than a quarter-wave length apart. Adjacent bends 68 which are lined up parallel to one edge of the dielectric sheet 52 are connected one each to one end of a shunt inductor 72. The other end of each inductor 72 is connected to the metal spacers 58 and 60. The shunt inductors 72 may be formed of several turns of coiled wire, the length of each coil being a small fraction of a quarter-wave length long.

The bends 70 lined up parallel to the edge of the dielectric sheet 52 opposite the first mentioned edge are formed with open capacitive gaps 74a and 74b. Capacitive gaps 76a and 76b are also formed near the ends of the lines 62 and 64, which terminate in input and output connectors 78 and 80. The capacitive gaps 74a and 76a on one side of the sheet 52 may be staggered with respect to the gaps 74b and 76b on the other side. Whether this is done or not depends on the amount of series capacitance required in a given design. More series capacitance will result with staggering than without staggering.

There is thus produced an array of quarter-wave length resonators, each having a series coupling discontinuity or series capacitance (gaps 74a, 74b, 76a, and 76b) at one end, and a shunt discontinuity or inductance (inductors 72) at the other end.

It is now apparent that the invention makes is possible to design microwave strip transmission line filters of simple design and having greatly reduced size, in some cases, no dielectric losses, high maximum attenuation in the stop band, and widely separated stop bands.

What is claimed is:

A bandpass elongated microwave strip transmission line filter capable of reducing low order harmonic losses and having a predetermined mid-frequency, comprising: elongated conductors arranged in lineal adjacent spaced-apart relationship between ends of the elongated filter; said conductors including a base portion extending in the aforesaid lineal relationship and stub portions placed midway of the base portions and extending on opposite sides of, and perpendicular to, said base portion and the spaces between adjacent conductors defining lumped capacitances with the spaces between conductors being greater at a position midway of the ends; each of said conductors having a length corresponding to the order of a half length of said mid-frequency with the stub portions acting as inductive elements of less than one-quarter wave length of the mid-frequency with the stub portions being shorter midway between the ends; parallel ground bars with oppositely disposed, inwardly projecting blocks; said stub portions being connected to said blocks so as to form the sole support for said conductors, whereby each of said conductors form two quarter-wave length bandpass filter sections at said mid-frequency, thereby to minimize electric field losses adjacent to the neighboring ends of said conductor bodies and minimize losses due to low order harmonics.

References Cited in the file of this patent

UNITED STATES PATENTS

| | | |
|---|---|---|
| 2,438,913 | Hansen | Apr. 6, 1948 |
| 2,751,558 | Grieg | June 19, 1956 |
| 2,760,169 | Engelmann | Aug. 21, 1956 |
| 2,867,782 | Arditi | Jan. 6, 1959 |

OTHER REFERENCES

Publication: "Handbook of Tri-plate Microwave Components," copyright Dec. 31, 1956, by Sanders Asso., Inc., Nashua, New Hampshire, pages 91–96 relied on.

Publication: "IRE Transactions on Microwave Theory and Techniques, vol. MTT-3, March 1955, No. 2, "Bandpass Filters Using Strip Line Techniques," by Bradley et al., pages 163–169 relied on.